Jan. 22, 1963 G. V. GONTIER 3,074,655
SHREDDING APPARATUS WITH SCREEN CLEARING COMB
Filed April 19, 1961 3 Sheets-Sheet 1
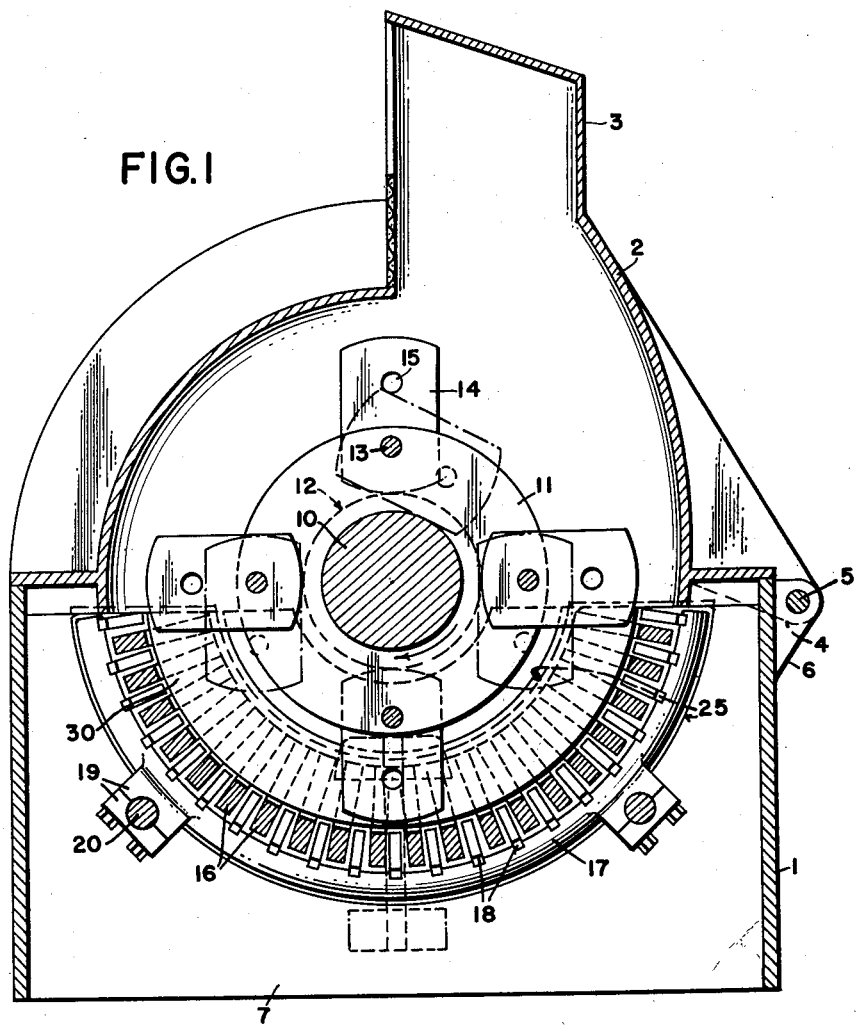
INVENTOR
GEORGES VICTOR GONTIER
BY
ATTORNEY Jan. 22, 1963 G. V. GONTIER 3,074,655
SHREDDING APPARATUS WITH SCREEN CLEARING COMB
Filed April 19, 1961 3 Sheets-Sheet 2

INVENTOR
GEORGES VICTOR GONTIER

BY
ATTORNEY

Jan. 22, 1963  G. V. GONTIER  3,074,655
SHREDDING APPARATUS WITH SCREEN CLEARING COMB
Filed April 19, 1961  3 Sheets-Sheet 3

INVENTOR
GEORGES VICTOR GONTIER

BY

ATTORNEY

United States Patent Office 3,074,655
Patented Jan. 22, 1963

3,074,655
SHREDDING APPARATUS WITH SCREEN
CLEARING COMB
Georges Victor Gontier, 38 Rue de Periole,
Toulouse, Haute-Garonne, France
Filed Apr. 19, 1961, Ser. No. 104,088
Claims priority, application France Apr. 22, 1960
4 Claims. (Cl. 241—88)

This invention relates to shredding apparatus of a general type that is widely used for shredding and screening various non-uniform and non-homogeneous materials, such as, for example, as household refuse or garbage.

Such shredding apparatus usually comprise an upwardly-concave part-cylindrical screen formed by a set of parallel spaced screen members or bars extending along generatrices of the part-cylindrical screen surface, and a shredding rotor mounted for rotation coaxially with the axis of said part-cylindrical surface and having shredder members, such as hammers, arranged to sweep the concave side of the surface so as to shred the materials dumped thereon and drive them down through the spaces between the screen members. The materials processed by such apparatus are of a composite character including various soft, sticky constituents as well as long flexible constituents, such as, strips of fabric, which all contribute to clog up the screening spaces, requiring frequent shut-downs for cleaning, and thereby increasing the cost of the process considerably.

To overcome this difficulty it has been proposed to provide a permanently-acting cleaning device in such apparatus in the form of one or more part-circular comb members arranged below the part-cylindrical screen and having radial fingers extending up through the spaces between the screen members, which combs are reciprocated parallel to the length of the screen members during the rotation of the shredder means in order to help clear the screening spaces of any materials caught therein. While shredding apparatus provided with the above described cleaning device needs to be stopped for cleaning at less frequent intervals than apparatus lacking said cleaning device, still the shutdowns are more frequent than would be desirable. It is found that a substantial proportion of the materials caught between the screen bars are swept longitudinally by the combing fingers towards the ends of the screen where they tend to stagnate and collect until they finally end up in obstructing the operation of the shredder.

It is an object of this invention to provide improved shredding apparatus of the type described which will be free of the stated drawback and can be operated for extremely long periods of time without shutdown for cleaning purposes, regardless of the nature of the materials processed therein.

According to an aspect of the invention there is provided shredding apparatus comprising a casing, a set of parallel spaced screen members supported at their ends in said casing and having major straight portions defining an upwardly concave part-cylindrical screen surface and end portions directed angularly from said major portions so as to lie radially inside of said surface, shredder means rotatable coaxially with said screen surface for sweeping the concave upper side thereof and operative to shred materials dumped thereon and discharge a major proportion of the shredded materials down through the spaces between said members, at least one auxiliary discharge aperture in the casing adjacent at least one end and preferably each end of said screen surface, and combing means positioned below said surface and having combing fingers projecting up through said spaces, said combing means being reciprocated parallel to the screen members beyond said straight major portions of the latter for clearing any materials caught in said spaces through the ends of the latter between said angularly directed end portions of the screen members and discharging such materials through said auxiliary discharge aperture or apertures.

Thus, it will be understood that any materials swept along the length of the screen by the combing means towards the ends of the screen will finally be discharged through the adjacent auxiliary apertures from which they may be passed to any suitable disposal, rather than stagnating at the ends of the screen within the casing and building up to an extent that eventually prevents proper operation of the apparatus.

An exemplary embodiment of the invention will now be described for purposes of illustration but not of limitation with reference to the accompanying drawings wherein:

FIG. 1 is a vertical cross sectional view on line A—A of FIG. 2 of shredding apparatus according to the invention;

FIGS. 3, 4 and 5 are fragmentary views illustrating some modified forms of the screen members.

Figure 2:
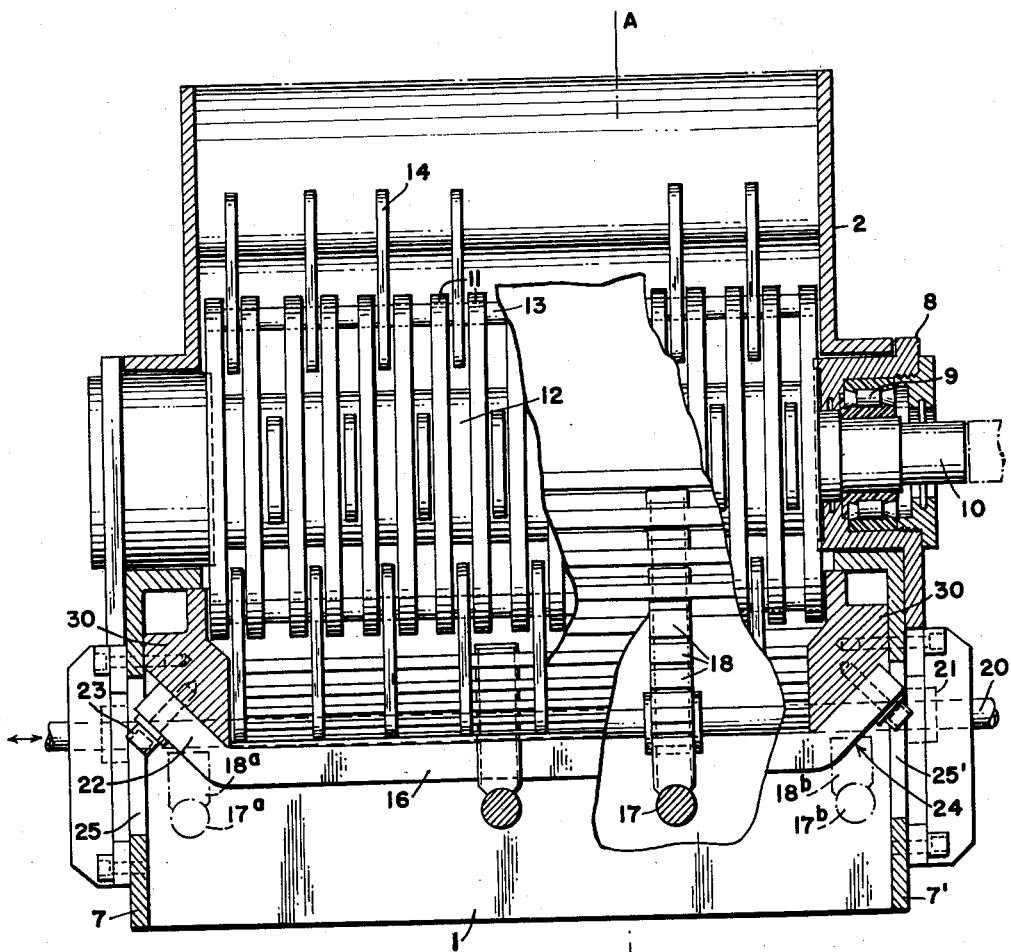
FIG. 2 is an axial vertical view of the apparatus partly in section and partly in elevation, with parts broken away.

Referring to FIGS. 1 and 2, it will be seen that the improved shredding apparatus embodying this invention comprises a lower casing section 1, such as a metal casing, and an upper casing section 2 which overlies the lower section and is removably attached thereto, as by means of one or more lugs 4 pivoted by a removable pin to one or more complementary lugs 6 projecting from the lower casing section 1. The upper section 2 is extended upwardly by a supply conduit or chute 3 through which materials to be shredded, such as household refuse, are delivered to the apparatus.

The lower casing 1 includes the two end walls 7 and 7' in which are mounted aligned bearing supports 8 receiving antifriction bearings 9 for rotatably supporting a rotor shaft 10. Secured on the shaft is a rotor structure comprising a plurality of spaced recessed discs 11 separated by spacer rings 12. Pivoted to each disc at equiangular positions thereon is a number of, e.g. four, shredder members or hammers 14 in the form of hard steel elements which are mounted on the discs so as to project radially beyond the circumference thereof when in extended positions assumed by them due to centrifugal force on rotation of the rotor. Preferably the shredder members 14 are each provided with two spaced holes 15 either of which can serve to connect the element to the disc by means of a pivot pin 13 so that after the elements have sustained a predetermined amount of wear in operation in one mounted position they can be repositioned using the other mounting hole 15 for a further extended period of useful operation.

When the shaft 10 is rotated from a suitable source of power, the hammer or shredder members 14 are all extended radially by centrifugal force and the arrangement is such that their outer ends then sweep a cylindrical surface which lies just short of the cylindrical surface of the screen assembly now to be described.

The screen assembly comprises a plurality of screen members or bars 16 which are supported at their ends in the lower casing section 1 in a manner presently described. The screen members 16 all include intermediate straight portions of major extent which are all parallel and spaced from one another along the generatrices of a common cylindrical surface, the upper concave side of which is swept by the outer ends of the shredder members 14 as mentioned above. With the arrangement so far described, it will be understood that the materials dumped on to the concave upper surface of the screen assembly will be subjected to shredding and crushing actions by the hammers, whereby a major proportion of the materials will be discharged through the spaces between the intermediate straight portions of the screen members and out through the open bottom of casing member 1 into suitable receiving means.

To prevent rapid clogging up of the spaces between screen members 16 by the crushed and shredded materials, a reciprocating combing assembly is provided. This assembly comprises, as shown, a pair of part-circular comb members 17 suitably supported a small distance below, and coaxially with, the part-cylindrical outer surface of the screen members 16 for reciprocation parallel to the major intermediate straight portions of said members. A plurality of spaced combing fingers 18 extend radially upwards from the members 17 towards and into the spaces between adjacent screen members 16. The comb members 17 are secured through radially outwardly extending spaced collar clamps 19 to a pair of parallel horizontal driving rods 20 which are slidably mounted in two pairs of sliding bearings 21 attached to the end walls 7 and 7' of casing section 1. The rods 20 are connected through means (not shown) with suitable drive mechanism conveniently operated from the same power source as that rotating the rotor assembly so as to impart synchronized reciprocations thereto.

The timing of the reciprocatory strokes of both combs is such that said strokes overlap somewhat in the midportion of the screen so as to ensure that the entire screen is swept clear by the reciprocating comb fingers projecting into the screening spaces.

In accordance with the present invention, the screen members 16 beyond their straight intermediate portions defining the screening surface proper, are each provided or formed with end extensions or portions 22 which are directed at angles with respect to said straight portions of the members, for example, at equal obtuse angles as between the two ends of the members, so that the end portions 22 lie radially inside axial projections of the screen surface as clearly shown in FIG. 2. The extensions 22 serve to attach the screen members to the casing, the attaching means, as shown, comprising bolts or screws 23 extending through holes formed in the extensions 22 and engaging suitable spaced bracket members or arms 30 at each end of the casing section 1.

Figure 6:
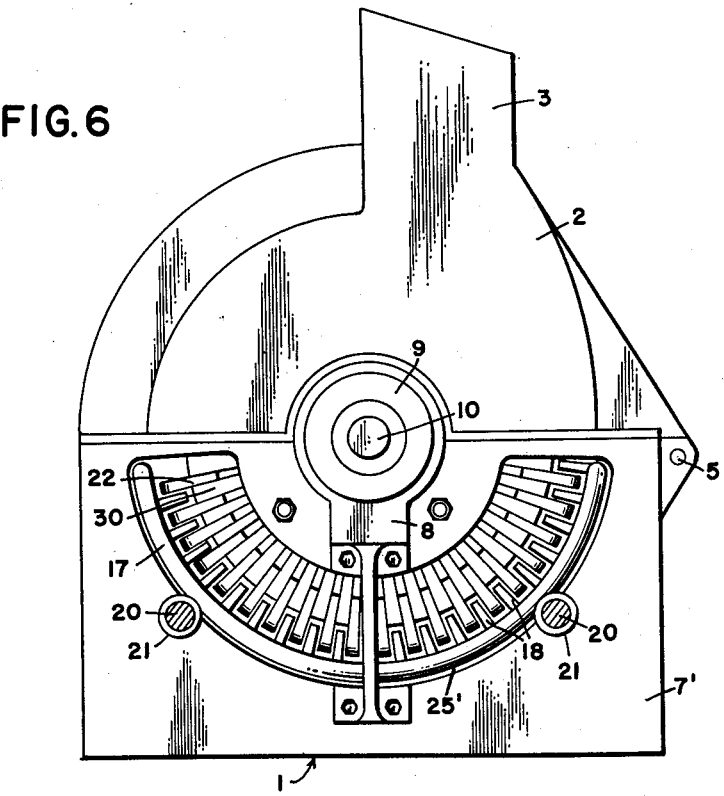
FIG. 6 is an end elevational view of the lower casing included in the apparatus of FIGS. 1 and 2.

Formed in the end walls 7 and 7' of the casing member 1 adjacent the opposite ends of the screen assembly are arcuate cut-outs or apertures 25, 25' which, as will be apparent from FIG. 1 and 6, are generally coaxial with the screen surface and have outer edges of somewhat larger radius than the outer radius of said cylindrical surface. According to an important feature of the invention, the comb members 17 in their reciprocatory motions are carried outwardly to positions substantially as shown at 17a and 17b respectively, in which the comb fingers 18a and 18b are positioned beyond the straight intermediate portions of the members 16 and adjacent the angled extensions 22 thereof, with the outer vertical surfaces of the comb fingers 18a and 18b lying in part axially beyond the outer inclined surfaces, such as 24, of the said extensions. As a result of this arrangement, any of the material constituents swept by the comb fingers outwardly along the screen are positively forced by said fingers from between the angularly directed extensions 22 and through the auxiliary discharge apertures provided by the cutouts 25 and 25'. The materials thus discharged may be recycled back into the shredder apparatus or may be otherwise disposed of. In this way there is no tendency whatever for refuse materials to build-up at the ends of the screen as was the case in prior shredding systems of the type contemplated herein, and the apparatus can be operated for extremely prolonged periods of time without requiring shutdown for cleaning purposes.

Figure 4:
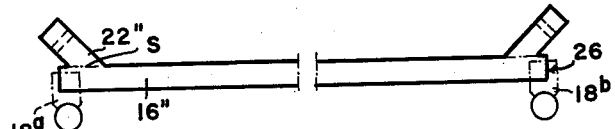

The screen members 16 with their angularly directed end extensions 22 may be constructed in any convenient way. Thus, the members may be integral steel bars suitably bent at their ends to provide said extensions. Or the members may be produced from straight steel bars 16' with bevel ends as shown in FIG. 3, and the end extensions 22' may be welded to the bevel surfaces as at s. Again, as shown in FIG. 4, the end extensions 22'' may be welded as at s to the side surfaces of straight steel bars 16'' of increased length, whereby the straight bar portions protrude somewhat at each end as shown at 26.

Figure 5:
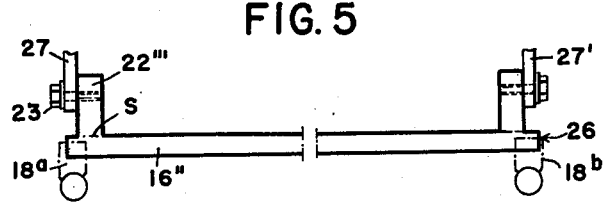

A further modification is shown in FIG. 5 where it is seen that the end extensions 22''' are arranged to extend at right angles to the straight portions of the bars 16''', being welded to side surfaces thereof as at s somewhat short of the ends 26 of the bar. In this case it will be seen that the end extensions 22''' are attached with bolts or screws 23 to perpendicular supporting flanges 27 and 27' secured to the casing section 1.

It will be evident that any number of further modifications may be made in the improved shredding apparatus within the scope of the invention claimed.

What I claim is:

1. Shredding apparatus comprising
   A. a casing including end walls having auxiliary discharge apertures therein,
   B. a set of screen members having
      (1) parallel, spaced apart, straight intermediate portions of major extent defining generatrices of a generally part-cylindrical screening surface, and
      (2) end portions directed angularly from the ends of said intermediate portions so as to extend radially inside of axial projections of said screening surface,
   C. means connected to said end portions of the screen members and mounting the latter in said casing with said auxiliary discharge apertures adjacent said end portions of the screening members,
   D. a shredding rotor mounted in said casing for rotation co-axially with respect to said screening surface and operative to shred materials dumped on said surface and to discharge the major portion of the shredded materials downwardly through the spaces between said intermediate portions of the screen members, and
   E. combing means reciprocable parallel to said straight intermediate portions of the screen members and including
      (1) combing fingers extending into said spaces between said intermediate portions of the screen members to clear said spaces of any materials caught therein,
      (2) the limits of the reciprocation of said combing means extending beyond the ends of said screening surface defined by said intermediate portions of the screen members so that said fingers travel between said angularly directed end portions to discharge the cleared materials through said auxiliary discharge apertures.

2. Shredding apparatus as in claim 1; wherein said auxiliary discharge apertures are arcuate slots coaxial with said screening surface and having an outer edge with a radius greater than the radius of curvature of said screening surface.

3. Shredding apparatus as in claim 2; wherein each of said arcuate slots has an inner edge with a radius of curvature smaller than said radius of curvature of the screening surface.

4. Shredding apparatus as in claim 3; wherein said means mounting the screen members in the casing includes arcuate mounting members secured to said end walls of the casing within the area bounded by said inner edge of the respective arcuate slots, and screw means securing said end portions of the screen members to said mounting members.

References Cited in the file of this patent

UNITED STATES PATENTS

| | | |
|---|---|---|
| 757,969 | Schoellhorn et al. | Apr. 19, 1904 |
| 1,520,228 | Elzemeyer et al. | Dec. 23, 1924 |
| 1,747,645 | Palmer | Feb. 18, 1930 |
| 1,751,009 | Liggett | Mar. 18, 1930 |
| 2,563,958 | Pollitz | Aug. 14, 1951 |

FOREIGN PATENTS

| | | |
|---|---|---|
| 193,985 | Great Britain | Mar. 6, 1923 |